July 31, 1956  L. J. BURNS  2,756,667
COMBINED TEMPERATURE-REGULATING AND SIGNALLING
DEVICE FOR COFFEE BREWERS
Filed June 16, 1953
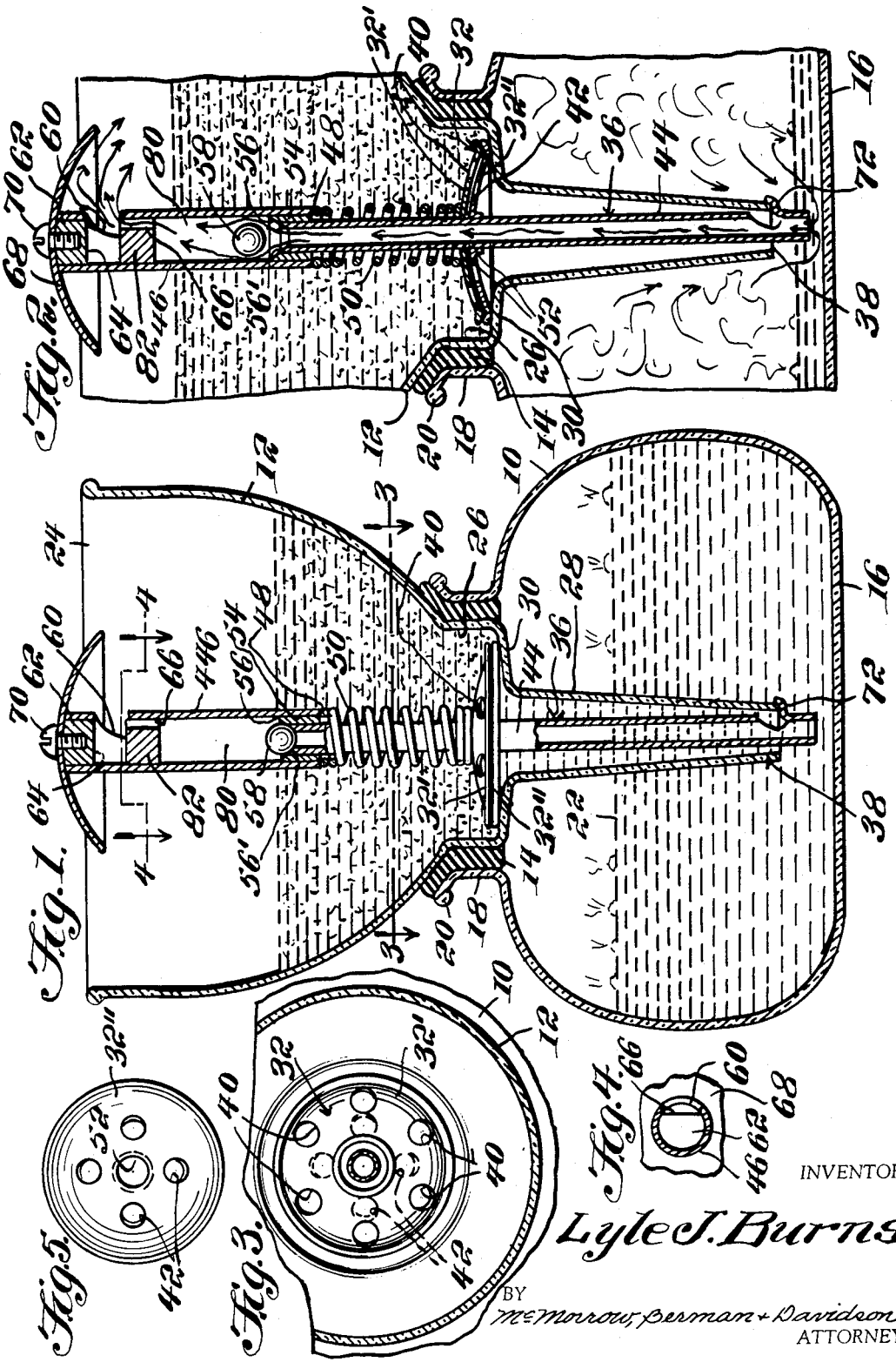
INVENTOR
*Lyle J. Burns,*
BY
*McMorrow, Berman + Davidson*
ATTORNEYS

United States Patent Office 2,756,667
Patented July 31, 1956

2,756,667

COMBINED TEMPERATURE-REGULATING AND SIGNALLING DEVICE FOR COFFEE BREWERS

Lyle J. Burns, Flint, Mich.

Application June 16, 1953, Serial No. 362,011

1 Claim. (Cl. 99—285)

This invention relates to coffee brewers of the so-called "drip" or vacuum type and more particularly to a signalling regulator device therefor.

A major problem with the ordinary drip or vacuum type coffee brewer is the possibility of failure to remove the lower receptacle from the heating surface after the fluid has been forced into the upper receptacle. If heat is applied to the lower receptacle after the water has risen and is contained in the upper bowl or receptacle, the lower receptacle or bottom portion of the brewer is subject to breaking, if made of glass, when the small amount of fluid remaining in the bottom portion disappears by boiling off. Further, the rubber gasket, forming a seal between the upper and lower sections of the brewer, will melt under continued heat application to the lower section upon failure to remove the brewer at the proper time.

In the instance where the components of the brewer are made of metal, continued heating after the fluid has been forced into the upper receptacle, results in discoloration and warping. In addition, the melting of the rubber gasket will impart the odor of melted rubber to the metal components rendering them unfit for further use.

To overcome these difficulties, the home appliance market offers automatic coffee brewers in which the heat is supplied through an integral electrical resistance heating element. This heating element is so controlled as to shut the flow of current at a predetermined time. However, the cost of these automatic electric coffee brewers is many times greater than the cost of the ordinary two-section brewer with which this invention is concerned.

It is therefore an object of this invention to provide a signalling means which can be applied to the ordinary vacuum type coffee brewer to audibly and continually warn of the depletion of fluid in the lower bowl so that the brewer can be removed from the heating surface in sufficient time to avoid the before-mentioned undesirable results.

It is a further object of this invention to provide a simple, efficient signalling device of low cost and easy installation to accomplish the desirable results of the more expensive automatic coffee brewers.

Another object is the provision of a whistle operated by the escape of steam as the audible signal to warn that the brewer should be removed from the heating surface.

Still another object of this invention is to provide means whereby the temperature at which the coffee is brewed will rise to a predetermined level, and no higher, found to produce optimum results. It is proposed, in this regard, to utilize the warning device steam escape passage as said temperature-controlling means.

Another object is to provide an improved filter means in a coffee brewer of the type referred to.

With these and other objects in view, as will appear in the course of the following specification and the claims appended thereto, a structural form to accomplish these objects is set forth in the accompanying drawings, by way of example, in which:

Figure 1 is a vertical sectional view of a coffee brewer embodying this invention, showing the fluid in the lower receptacle at the boiling point with some of the fluid already in the upper receptacle;

Figure 2 is a sectional view partially broken away, similar to Figure 1, showing substantially all of the fluid forced into the upper receptacle and the warning device operating;

Figure 3 is a sectional view, partially broken away, taken on line 3—3 of Figure 1;

Figure 4 is a sectional view, partially broken away, taken on line 4—4 of Figure 1; and Figure 5 is a top plan view of a filter element construction according to this invention.

Referring to Figure 1, the coffee maker or coffee brewer is of the usual vacuum or "drip" type construction comprising a lower receptacle or bowl 10, and an upper bowl or receptacle 12 interfitted and sealed by a rubber gasket 14.

The lower bowl 10 is of the usual construction having a flat bottom 16 and a narrowing or neck portion 18. An outwardly flared lip 20 extends from the neck portion 18. This lower bowl is the heat-receiving or boiler element into which the fluid 22, here water, is contained and is the element which is placed upon a heating surface so that the water can be made to boil upon application of heat to bottom 16.

Upper receptacle 12 has the usual open top 24 and is convexly narrowing from the top to a smaller cylindrical portion 26 which forms a tight fit with the gasket 14 when inserted to produce an air-tight seal between the upper and lower bowls. A depending tube 28 is formed integrally with the cylindrical portion 26 by a slightly downwardly inclined flange 30 and has its lower end 38 open. The lower end 38 terminates a small determined distance above the bottom 16. A filter disc assembly 32 rests upon the inclined flange 30.

The particular filter disc assembly here illustrated consists of two cupped discs 32' and 32", one nested within the other. I provide a plurality of holes 40 in disc 32', and holes 42 in disc 32", said holes 40, 42 being offset relative to one another. The filter disc assembly 32 will have more area thereby increasing the speed with which liquid in the upper receptacle may descend by gravity to the lower bowl upon brewing of the coffee.

A hole 52 is punched or drilled in the center of the filter disc assembly so as to provide a slip fit for a center tube to be described hereinafter.

A hollow central tube, denoted generally as 36, is placed vertically and extends centrally within the depending tube 28. Central tube 28 extends slightly below the open end 38 of the depending tube 28. Since the open end 38 is spaced a small distance from the bottom 16 of lower receptacle 10, it is apparent that the lower ends of both tubes 28 and 36 will be well below the water line in the lower receptacle.

Central tube 28 is formed of two tube members 44 and 46, the former being of smaller diameter and extending centrally within the latter as clearly shown in Figures 1 and 2. Tube member 46 is rigid with tube member 44. The lower portion of tube member 46 forms a shoulder 48, against which a spring 50, surrounding tube 46, abuts. The lower end of spring 50 rests upon the top of filter disc assembly 32.

The lower end of the larger tube member 46 of the central tube has a hollow bushing 54 press-fitted or otherwise fixedly secured, said bushing being made rigid with the upper end of tube member 44. Bushing 54 has an upper tapered edge 56 providing a seat for the solid spherical ball 58 which when seated as in Figure 1, acts as a valve to close the upper end of smaller tube member 44.

The upper edge 56' of tube member 44 may be tapered so as to form a continuous surface with edge 56.

At the upper end of larger tube member 46 an opening 60 is cut into the tube wall. A sound-producing means comprising a whistle 62 is inserted by a press fit at the top of tube 46 so that the intermediate hollow chamber 64 of whistle 62 registers with opening 60. It will be noted that the lower portion of whistle 62 has a tiny passageway 66 therein communicating with the hollow chamber 64. A concavo-convex plate 68 is secured to the top of whistle 62 as by screw 70. The purpose of plate 70 is to provide a deflector for liquid which might pass through the whistle to prevent the escape of such liquid from the receptacle 12.

In operation, the coffee brewer works in the conventional manner. As the water 22 is heated to the boiling point, the steam pressure within receptacle 10 will be increased, forcing the water upward through the tube 28 and into upper receptable 12. Although the water will rise in tube 36 to the level of the water in receptacle 10, the water will not be forced upwardly therein since the ball 58 has closed this passage to the atmosphere. However, when all of the liquid has risen into the upper receptacle 12, as shown in Figure 2, the steam generated by a heating surface (not shown) will escape through the smaller tube member 44, as indicated by the arrows, lifting ball 58 from the seat formed by the inclined surface 56, entering the larger tube member 46 and then building up pressure in the space 80 formed by the wall of tube member 46 as the steam is forced to flow into the tiny passageway or orifice 66 in the lower portion 82 of whistle 62. As the steam expands from the orifice 66 into the whistle chamber 64 and out through the opening 60, a whistling sound will result thus giving warning that the coffee brewer is to be removed from the heating surface.

Adjacent the lower end of the central tube 36, a hook 72 is struck out of the material of the lower tube member 44. Hook 72 is extended at such an angle as to cause the opening left by striking out the hook to be substantially closed, due to the face that the portion of the tube 36 in which the opening is formed will be biased by cam action against the wall of tube 28. This action obtains due to the tendency of spring 50 to expand, thereby causing the hook to be cammed to the right in Figure 2.

By placing the hook 72 at a predetermined location relative to the lower edge of tube 26, it is obvious that the time between the rising of the water and the blowing of whistle 62 will be predetermined accordingly.

The spring 50 allows for the resistance necessary to oppose the force of the water as it is forced from the lower to the upper receptacle.

From the foregoing it is apparent than an audible warning means is operated automatically by steam escaping through a central tube having a normally closed valve means intermediate its length and a whistle at its upper end. Also, it will be noted that means for determining the time desired between the rise of the water and the sounding of the warning means has been provided.

Further, the fact that the steam passes through a passage wholly separate from the upper receptacle results, it has been found by experimentation, in the temperature of the brew rising to 203°–205° F. and no higher. This is generally accepted as the optimum temperature at which coffee should be brewed.

What is claimed is:

In a coffee brewer, a lower receptacle; an upper receptacle sealably interfitted at its lower end with the upper end of the lower receptacle and including a depending tube opening at its lower end within the lower receptacle and opening at its upper end into the interior of the upper receptacle, disc-like filter means seated upon the bottom of the upper receptacle and extending across the upper end of said tube, said filter means having a center opening, a warning signal tube extending within the upper receptacle and first named tube, said signal tube being spaced from the wall of the first named tube to permit free flow of fluid from the lower receptacle through the first named tube and filter means into the upper receptacle, said signal tube being open at its lower end into communication with the interior of the lower receptacle and having its upper end open to atmosphere within the upper portion of the upper receptacle; check valve means within the signal tube normally gravitating to the closed position to prevent flow through the signal tube, said check valve means being selected of a value to remain seated until subjected to pressure rising within the lower receptacle and signal tube to a predetermined extent following exhaustion of the fluid contents of the lower receptacle into the upper receptacle through said first named tube, a signal device within the upper end of said signal tube adapted for actuation responsive to the flow of steam therethrough following movement of the check valve means to open position, said signal tube including a circumferential shoulder externally provided thereon intermediate its ends, in spaced relation to the filter means, a spring circumposed about the signal tube and abutting against the shoulder at one end and against the filter means at the other end, said spring being held under compression so as to exert a pressure against the filter means tending to force the same to a seated position against the lower end of the upper receptacle, and hook means on the lower end of the signal tube engaging the lower end of the first named tube, to prevent upward movement of the signal tube under pressure of said spring, said hook means being adapted for disengagement to free the signal tube for removal from the upper receptacle and first named tube, responsive to manual depression of the signal tube against the restraint of the spring.

References Cited in the file of this patent

UNITED STATES PATENTS

| | | |
|---|---|---|
| 259,580 | Ohm | June 13, 1882 |
| 579,666 | Wigginton | Mar. 30, 1897 |
| 871,491 | Dunlap | Nov. 19, 1907 |
| 1,843,241 | Pouget | Feb. 2, 1932 |
| 2,275,746 | Edwards | Mar. 10, 1942 |
| 2,360,569 | Masin | Oct. 17, 1944 |

FOREIGN PATENTS

| | | |
|---|---|---|
| 655,742 | France | Dec. 22, 1928 |
| 710,977 | France | June 16, 1931 |
| 835,095 | France | Sept. 12, 1938 |